(12) United States Patent
Weh et al.

(10) Patent No.: US 7,424,897 B2
(45) Date of Patent: Sep. 16, 2008

(54) CONNECTION COUPLING

(76) Inventors: Erwin Weh, Siemensstrasse 5, 89257 Illertissen (DE); Wolfgang Weh, Siemensstrasse 5, 89257 Illertissen (DE)

( * ) Notice: Subject to any disclaimer, the term of this patent is extended or adjusted under 35 U.S.C. 154(b) by 229 days.

(21) Appl. No.: 10/506,362

(22) PCT Filed: Mar. 1, 2003

(86) PCT No.: PCT/EP03/02110

§ 371 (c)(1),
(2), (4) Date: May 11, 2005

(87) PCT Pub. No.: WO03/074309

PCT Pub. Date: Sep. 12, 2003

(65) Prior Publication Data

US 2005/0205141 A1 Sep. 22, 2005

(30) Foreign Application Priority Data

Mar. 2, 2002 (DE) .............................. 202 03 248 U

(51) Int. Cl.
*F16L 37/36* (2006.01)
(52) U.S. Cl. ................ 137/614.06; 251/149.9
(58) Field of Classification Search ...............
137/614.04–614.06, 613; 251/359, 149.1, 251/149.6, 149.9, 214, 325, 332, 333; 285/314–317, 285/345, 101–103, 332.2, 347, 375, 374, 285/336, 910; 277/502, 579, 585, 500
See application file for complete search history.

(56) References Cited

U.S. PATENT DOCUMENTS

| 2,070,013 | A | | 2/1937 | Krannak |
| 2,092,116 | A | * | 9/1937 | Hansen .................. 285/277 |
| 2,742,052 | A | * | 4/1956 | McKee .................... 137/329.1 |
| 3,077,330 | A | | 2/1963 | Lampbear |
| 3,112,765 | A | * | 12/1963 | Crissey et al. .......... 137/565.26 |
| 3,240,520 | A | | 3/1966 | Dailey et al. |

(Continued)

FOREIGN PATENT DOCUMENTS

DE 819366 C 10/1951

(Continued)

OTHER PUBLICATIONS

U.S. Appl. No. 11/632,329, filed Jan. 12, 2007, Weh et al.

(Continued)

*Primary Examiner*—John Rivell
*Assistant Examiner*—Craig Price
(74) *Attorney, Agent, or Firm*—Knobbe, Martens Olson & Bear LLP

(57) ABSTRACT

The aim of the invention is to provide a simple and compact design as well as a safe operation of a connection coupling (10) for transferring gaseous and/or liquid fluids, particularly for filling vehicle fuel tanks, comprising an inlet area (12), which is provided with an inlet valve (45), connected to a supply line (12') and to a ventilating line (12"), and which has a pressure compensation space (44) and a ventilating valve (35). To this end, the invention provides that the ventilating valve (35) is formed by a sealing disc (24) that can be displaced in a controlled manner up to and away from the inlet valve (45) in an axial direction of the connection coupling (10).

9 Claims, 2 Drawing Sheets

U.S. PATENT DOCUMENTS

Figure 1:
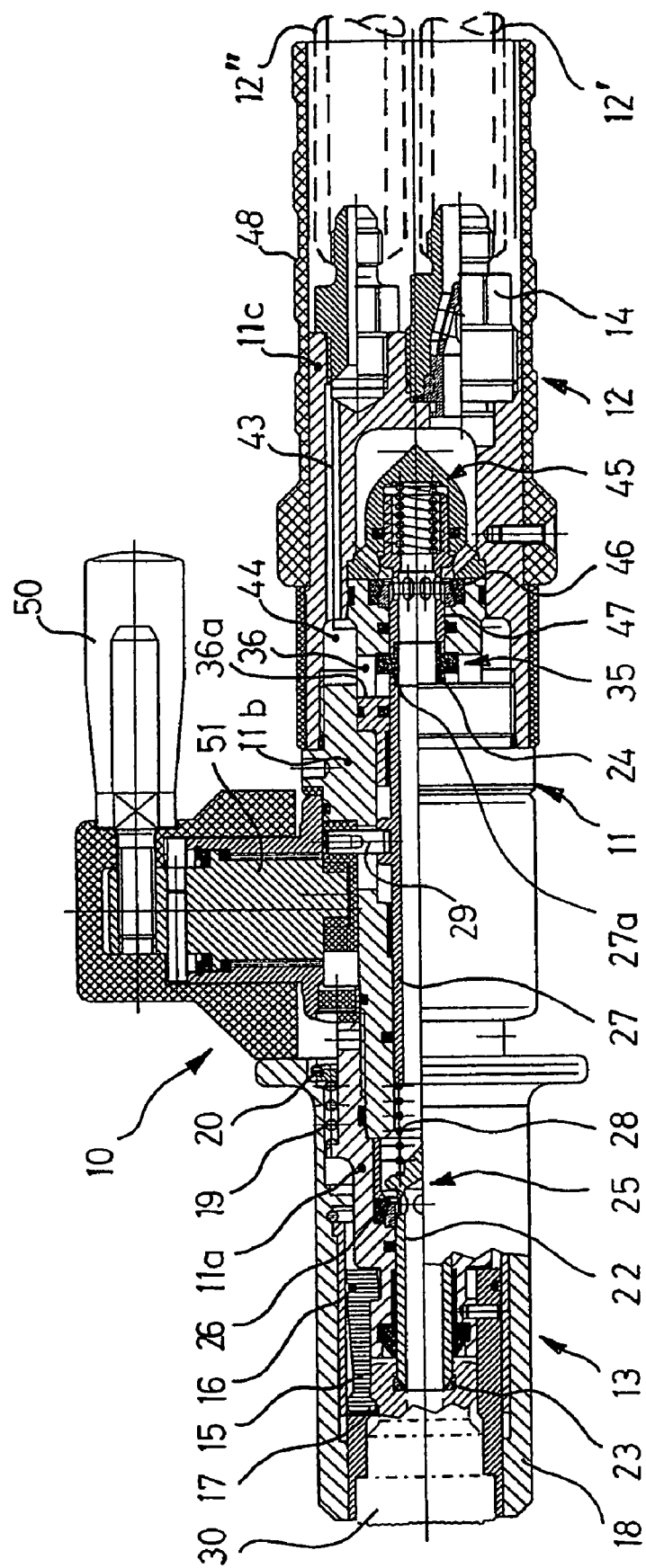

| | | | |
|---|---|---|---|
| 3,680,591 A | 8/1972 | Vik | |
| 3,731,705 A | 5/1973 | Butler | |
| 4,109,686 A | 8/1978 | Phillips | |
| 4,181,150 A | 1/1980 | Maldavs | |
| 4,222,411 A | 9/1980 | Herzan et al. | |
| 4,339,023 A | 7/1982 | Maycock | |
| 4,347,870 A | 9/1982 | Maldavs | |
| 4,469,149 A | 9/1984 | Walkey et al. | |
| 4,493,475 A * | 1/1985 | Baird | 251/149.1 |
| 4,934,419 A | 6/1990 | Lamont et al. | |
| 5,014,743 A * | 5/1991 | Makishima | 137/614.03 |
| 5,080,132 A * | 1/1992 | Manz et al. | 137/614.04 |
| 5,095,947 A * | 3/1992 | Weh et al. | 137/614.06 |
| 5,156,198 A | 10/1992 | Hall | |
| 5,249,612 A | 10/1993 | Parks et al. | |
| 5,297,574 A * | 3/1994 | Healy | 137/68.15 |
| 5,365,984 A | 11/1994 | Simpson et al. | |
| 5,413,309 A * | 5/1995 | Giesler | 251/149.9 |
| 5,464,042 A * | 11/1995 | Haunhorst | 137/595 |
| 5,605,182 A | 2/1997 | Oberrecht et al. | |
| 5,647,910 A | 7/1997 | Brown | |
| 5,923,572 A | 7/1999 | Pollock | |
| 6,035,894 A | 3/2000 | Weh et al. | |
| 6,179,300 B1 | 1/2001 | Baumann et al. | |
| 6,202,383 B1 | 3/2001 | Reiter | |
| 6,343,630 B1 * | 2/2002 | Dubinsky | 141/385 |
| 6,394,150 B1 | 5/2002 | Haimovich et al. | |
| 6,962,177 B1 | 11/2005 | McCommons | |
| 2002/0069934 A1 | 6/2002 | Peattie | |
| 2005/0161097 A1 | 7/2005 | Weh et al. | |
| 2005/0205141 A1 | 9/2005 | Weh et al. | |
| 2005/0211334 A1 | 9/2005 | Weh et al. | |
| 2005/0212289 A1 | 9/2005 | Weh et al. | |

FOREIGN PATENT DOCUMENTS

| | | |
|---|---|---|
| DE | 1185938 B | 1/1965 |
| DE | 1226904 B | 10/1966 |
| DE | 19834671 | 2/2000 |
| DE | 20317914 U1 | 12/2004 |
| EP | 0039977 | 11/1981 |
| EP | 0487844 | 6/1992 |
| FR | 1055252 A | 2/1954 |
| WO | WO 88/01601 A | 3/1988 |
| WO | WO 93/20378 | 10/1993 |
| WO | WO 98/04866 | 2/1998 |
| WO | WO9805898 A1 | 2/1998 |
| WO | WO 99/02913 | 1/1999 |
| WO | WO0052378 A1 | 9/2000 |

OTHER PUBLICATIONS

U.S. Appl. No. 11/915,260, filed Nov. 21, 2007, Weh et al.

* cited by examiner

CONNECTION COUPLING

The invention relates to a connection coupling for the transfer of gaseous and/or liquid fluids, especially for filling the gas tanks of motor vehicles.

Such connection couplings are to ensure a secure and quickly connectable transfer of a fluid from a pressurized source, e.g. from a filling station to a vehicle. The particularly important aspect in this respect is the simple and secure ability to operate the same, so that even in case of high filling pressures of 200 bars and more, easy handling is ensured.

Such a connection coupling has been described in WO 98/05898 of the applicant, with the quick-action connection coupling having a housing with a fluid inlet and a fluid outlet as well as several valves in order to ensure a secure sealing of the quick-action connection coupling until the complete establishment of the connection. Said valves are switched after the attachment of the quick-action connection coupling by twisting a control lever in a predetermined sequence, with the discharge valve being opened first by sliding the quick-action connection coupling onto a connection nipple, whereupon following further movement of the control lever the collet chucks acting as locking elements are closed and finally the inlet valve is opened. The control lever is in engagement via an eccentric shaft with the sliding sleeve for activating the collet chucks and with a sealing piston which also releases the fluid inlet after the performed connection of the connection coupling. Moreover, a ventilation valve is provided which allows pressure compensation prior to removing the connection coupling, so that there is no likelihood of recoil even at high pressures.

Although this provides an especially secure possibility for connection, this known connection coupling is still relatively complex in its design and requires a relatively large amount of space, especially when connecting a ventilating line in addition to the filling or supply line.

The invention is accordingly based on the object of providing a connection coupling, especially a quick-action connection coupling of the kind mentioned above, which in combination with a simple and compact configuration offers especially secure operation.

This object is achieved by a connection coupling according to the features of claim 1. Preferred further developments of the invention are the subject matter of the dependent claims.

The proposed connection coupling is especially suitable for use in a quick-action connection coupling for refueling natural gas motor vehicles. An especially simple and compact design is obtained because the ventilation valve in the form of a sealing disk is provided with an especially compact and stable design and can thus be integrated in a compact way in the connection coupling. In particular, the sealing disk is provided on its face surfaces in the preferred embodiment with sealing edges which are offset like annular shoulders and which engage in opposite, inner shoulders of the valve slides. A swelling of the sealing edges is thus prevented at high pressures, thus leading to an especially low-wear secure sealing.

This is also promoted by the fact that the sealing disk is guided in the preferred embodiment on the outer circumference during its axial movement, thus preventing any jamming. It is especially prevented through this guidance in the axial direction that the sealing disk and its sealing edges could be damaged by "obliquely" meeting the opposite element.

As a result of pass-through slots integrated within the connection coupling, as especially in a guide part or a valve seat sleeve, a rapid pass-through to a pressure compensation chamber is achieved on the circumference of the sealing disk and thus a complete ventilation of the connection coupling to a ventilation hose is achieved. The supply line (in particular a high-pressure hose) and the ventilation line which is parallel thereto, which is preferably provided in the form of a gas return line, are preferably at least partly enclosed in the inlet region in a compact way by a housing cap which is also used as a handle. This ensures easy operation, so that the quick-action connection coupling can also be easily connected by non-professionals.

The pressure compensation chamber enclosing the sealing disk is preferably arranged as an annular space which is in connection with the ventilation line via a bore provided in the inlet region. This creates a simple and compact connection of the pressure compensation chamber with ventilation line on the rear side. The sealing disk is preferably made of PTFE or copper or a similarly wear-resistant material, with a crushing of the sealing surfaces being prevented by the guidance on the outside circumference. The sealing disk can also be made of a composite material with low-friction plastic disks, with excessive wear and tear being securely prevented by the guidance in the axial direction and the corresponding fit of the sealing edges even under high pressures.

Figure 2:
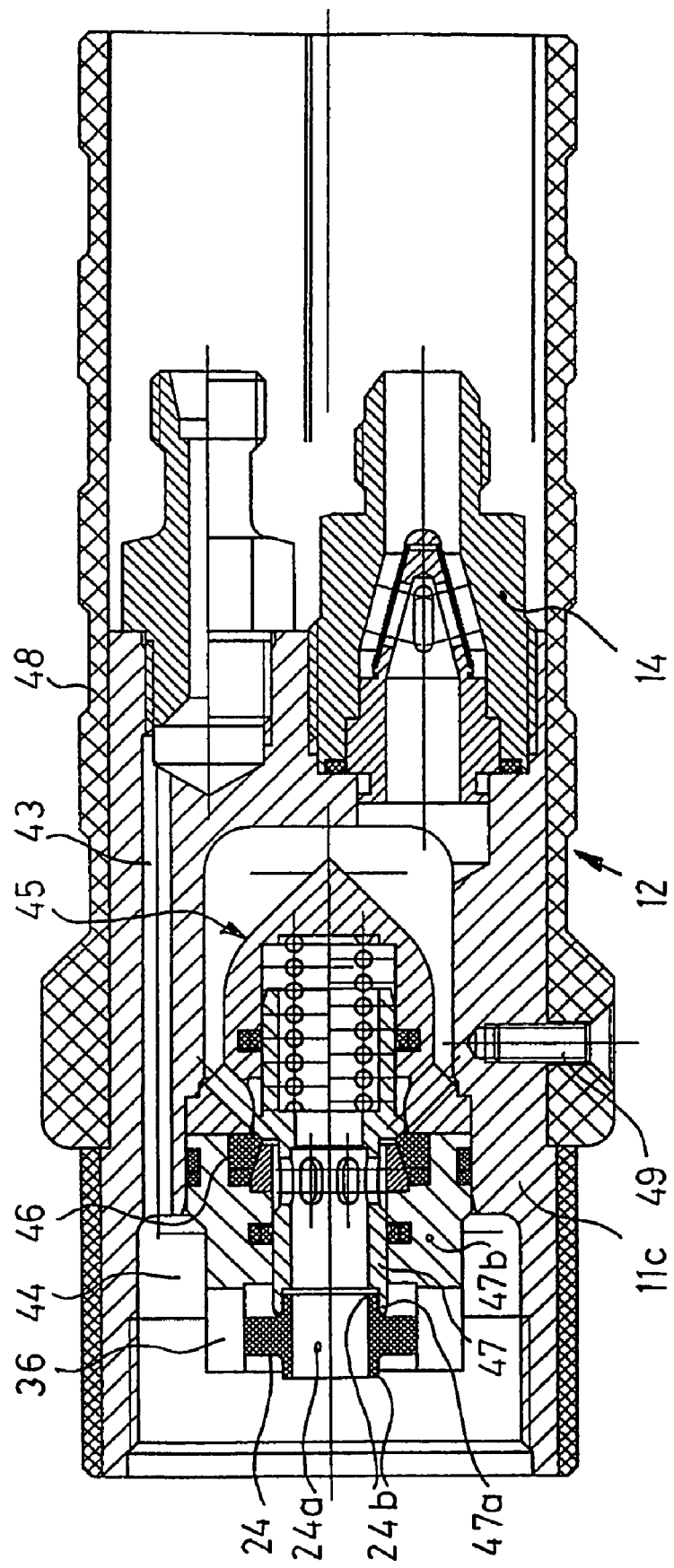

An embodiment of the invention is now explained and described in closer detail by reference to the enclosed drawings, wherein:

FIG. 1 shows a side view of a connection coupling with an integrated inlet and ventilation valve, with the connection coupling being shown in a longitudinal semi-sectional view and in the position connected to a connection nipple, and FIG. 2 shows an enlarged representation of the inlet region of the connection coupling according to FIG. 1.

FIG. 1 shows a preferred embodiment of a connection coupling 10 in the form of a so-called quick-action connection coupling which is coupled to a connection nipple indicated in this case on the left side. The connection coupling 10 comprises a tubular housing 11 with several mutually screwed-down housing parts 11a, 11b and 11c, with the right housing part 11c being used as the inlet region 12 and the left region as outlet 13 for the forwarding of the fluid to be transmitted to the connection nipple 30. The inlet region 12 comprises a connection adapter 14 to which a fluid line 12' can be connected via a thread for supplying the fluid to be transferred. The connection adapter 14 with an inserted filter sleeve can be configured in adjustment to the fluid to be transferred, especially to the desired feed pressure values, opening cross sections, etc.

In the region of outlet 13, several oblong collet chucks 15 are provided which are arranged in tubular form and which can be spread in a radially outward fashion shortly before the insertion on the connection nipple 30. The oblong collet chucks 15 are pre-tensioned by an annular spring 16, so that the collet chucks 15 can spread radially to the outside in an automatic manner (as known by the aforementioned state of the art). At the left outer end with inwardly crimped surfaces, the collet chucks 15 comprise interlocking engagement profiles 17 which are configured so as to correspond to a groove-like connecting profile section of the connection nipple 30.

An outside sliding sleeve 18 is provided around the collet chucks 15, which sliding sleeve is guided on the cylindrical outside jacket of the left housing part 11a and is pre-tensioned with a pressure spring 19 in the direction away from the connection nipple 30. The pressure spring 19 rests on a support ring 20 and thus pushes the sliding sleeve 18 to a control or actuating lever 50 with an eccentric shaft 51. Their configuration is also described in closer detail in the aforementioned state of the art, so that any further explanation can be omitted. It merely needs to be mentioned for reasons of completeness that in the region of the outlet 13 a sealing piston 22 is inwardly guided which comprises at its front face side a conical sealing surface 23 for sitting close to a sealing ring of the connection nipple 30, so that the gaseous and/or liquid fluid which substantially flows along the central axis of the connection coupling 10 cannot escape to the outside.

The discharge valve 25 provided on the sealing piston 22 seals by means of a sealing ring as valve seat 26 relative to the sealing piston 22 in the closed position. The discharge valve 25 is pressurized by a pressure spring 28 which rests towards the right side on a switch slide 27. This discharge valve 25 ensures that in the uncoupled position (not shown here) or shortly before the connection of the connection coupling 10 with the connection nipple 30 the fluid supplied through the connection adapter 14 cannot flow out. The switch slide 27 opposite the discharge valve 25 is displaced during the uncoupling of the connection coupling 10 from the connection nipple 30 along the connection coupling axis and thus forms a ventilation valve 35 in combination with a sealing disk 24. The ventilation valve 35 and the switch slide 27 are actuated by pivoting the control lever 50 because the eccentric shaft 51 which is connected with the same and is held in a sleeve 52 is coupled with the switch slide 27, namely through the engagement of a bolt 29.

As can be seen from the connection position of the connection coupling 10 as illustrated here, the engagement profile 17 of the collet chucks 15 is brought into engagement with the connection nipple 30 during the insertion on the connection nipple 30. By moving (pivoting by approx. 180°) the control lever 50 to the position as shown here, the sliding sleeve 18 is pushed over the collet chucks 15 and thus locked. When the pressure is applied (the beginning of the tank filling process), the sealing piston 22 is displaced at first to the left (also under the action of spring 28). When it sits close to the sealing surface 23, the valve seat 26 on the sealing piston 22 and thus the discharge valve 25 are opened under displacement of the sealing piston 22 to the right. In this process, the engagement profile 17 has already engaged on the correspondingly configured connecting profile section of the connection nipple 30. As a result of the axial movement of the sliding sleeve 18, the same engages over the radially outer ends of the collet chucks 15, so that they are held in an interlocked way on the connection nipple 30.

For releasing the connection coupling 10 and thus returning the connection position as shown here to the opening position, the sliding sleeve 18 is pushed back by the pressure spring 19 after the twisting of the control lever 50. After a short path, the collet chucks 15 can spread again in a radially outward manner. Since the fluid pressure was interrupted beforehand (e.g. by closing a refueling valve), the sealing piston 22 is additionally pushed here to the right in the direction towards the inlet region 12 and the discharge valve 25 on the valve seat 26 is closed.

The inlet region 12 further comprises an inlet valve 45 with an associated valve seat 46 centrally in the housing 11 or the housing part 11*c* of the connection coupling 10, as is shown on an enlarged scale in FIG. 2. The inlet valve 45 is also axially displaceable by the control lever 50 and its eccentric shaft 51 by coupling with the switch slide 27. Said switch slide 27 displaces a valve slide 47 of the inlet valve 45 to the opening position via the sealing disk 24 in the illustrated connection position, so that the fluid flowing in from the inlet region 12 can flow through the valve slide 47 and a pass-through 24*a* in the sealing disk 24 and the tubular switch slide 27 towards the outlet 13.

When the connection coupling 10 is released, the switch slide 27 is displaced (here via bolt 29) to the left by twisting the control lever 50, so that the sealing disk 24 can also detach from the sealing engagement. The pressure can thus decrease within the connection coupling 10 via the pass-through slots to a pressure compensation chamber 44. In this process, the sealing edges 24*b* of the sealing disk 24 and the inside shoulders 27*a* or 47*a* of the switch slide 27 or valve slide 47 detach from each other, so that the pressure within the connection coupling 10 can decrease within the connection coupling 10 via the pass-through slots 36 to a pressure compensation chamber 44. The pass-through slots 36 are preferably arranged as milled parts in a guide part 47*b* of the valve slide 47, whereas the pressure compensation chamber 44 is arranged as a shoulder-like annular space in a graduation on the housing part 11*c* around the sealing disk 24. The pressure compensation chamber 44 is thus sealed by several seals. The sealing disk 24 can move in this axial movement only up to a limit stop 36*a* at the left edge of the pass-through slots 36, with the sealing disk 24 being guided in the axial direction precisely on webs between the pass-through slots 36. As a result, the sealing edges 24*b* of the sealing disk 24 are not crushed during the contact with the inner shoulders 27*a* and 47*a*, but are guided precisely into the sealing position.

As was mentioned above, the ventilation valve 35 is opened by the eccentric shaft 51 and the switch slide 27 during the uncoupling of the connection coupling 10. As a result, any still applying pressure medium can thus flow via the pressure compensation chamber 44 to a ventilation bore 43 which extends parallel to the central fluid passage (through valves 45, 35 and 25) in the housing part 11*c* of the connection coupling 10. The ventilation bore 43 opens into a second line 12″ which is preferably arranged as a return hose and is enclosed by a housing cap 48 like the supply line. Said housing cap 48 is connected in a torsionally rigid way with a transversal screw 49 in order to serve as a handle for simple handling. The ventilation line 12″ and the fluid line 12′ which is connected to adapter 14 thus always extend at least substantially parallel with respect to each other.

The invention claimed is:

1. A connection coupling for transferring gaseous and/or liquid fluids, especially for filling gas tanks of motor vehicles, comprising an inlet region which comprises an inlet valve and is connected with a supply line and a ventilation line and comprises a pressure compensation chamber and a ventilation valve, the connection coupling having a longitudinal axis, wherein the ventilation valve is formed by a sealing disk which can be moved in the axial direction of the connection coupling in a controlled manner towards the inlet valve and away from the same, and wherein the sealing disk comprises a pair of sealing surfaces generally facing in opposite directions, each of which is formed on an end of the sealing disk and lies generally normal to the longitudinal axis of the coupling, the sealing disk further comprising two abutment surfaces disposed between the pair of sealing surfaces, the two abutment surfaces being configured to limit movement of the sealing disk in both longitudinal directions.

2. A connection coupling according to claim 1, wherein the sealing disk comprises a central pass-through.

3. A connection coupling according to claim 2, wherein the sealing surfaces engage in mutually opposite shoulders provided on the inside of valve slides of the ventilation and inlet valves at least when the coupling is in the connection position.

4. A connection coupling according to claim 1, wherein the sealing disk is guided on its outside circumference.

5. A connection coupling according to claim 1, wherein pass-through slots to the pressure compensation chamber are provided on the outside circumference of the sealing disk.

6. A connection coupling according to claim 5, wherein the pass-through slots to the pressure compensation chamber are milled into a guide part of the inlet valve.

7. A connection coupling according to claim 1, wherein the sealing disk comprises PTFE or copper.

8. A connection coupling according to claim 1, wherein the supply line and the ventilation line are enclosed at least partly by a housing cap arranged as a handle.

9. A connection coupling according to claim 1, wherein the pressure compensation chamber is arranged as an annular space which is in connection with the ventilation line via a bore.

\* \* \* \* \*